(12) United States Patent
Whitmore

(10) Patent No.: US 10,393,218 B2
(45) Date of Patent: Aug. 27, 2019

(54) VISCOUS DAMPER

(71) Applicant: SIKORSKY AIRCRAFT CORPORATION, Stratford, CT (US)

(72) Inventor: Robert Charles Whitmore, Woodbridge, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 266 days.

(21) Appl. No.: 15/503,445

(22) PCT Filed: Aug. 11, 2015

(86) PCT No.: PCT/US2015/044671
§ 371 (c)(1),
(2) Date: Feb. 13, 2017

(87) PCT Pub. No.: WO2016/025491
PCT Pub. Date: Feb. 18, 2016

(65) Prior Publication Data
US 2017/0241508 A1 Aug. 24, 2017

Related U.S. Application Data

(60) Provisional application No. 62/036,674, filed on Aug. 13, 2014.

(51) Int. Cl.
*F16F 15/023* (2006.01)
*B64C 27/06* (2006.01)
(Continued)

(52) U.S. Cl.
CPC ............ *F16F 15/023* (2013.01); *B64C 27/06* (2013.01); *B64C 27/82* (2013.01); *F16D 1/02* (2013.01);
(Continued)

(58) Field of Classification Search
CPC .. F16F 15/023; F16F 2234/02; F16F 2222/12; F16D 3/12; F16D 1/02;
(Continued)

(56) References Cited

U.S. PATENT DOCUMENTS 2,729,518 A * 1/1956 O'Connor ............... F16C 27/04
188/268
3,162,471 A * 12/1964 Mazziotti ............ F16C 11/0614
403/38

(Continued)

OTHER PUBLICATIONS

International Search Report for International Appln. No. PCT/US2015/044671; International Filing Date: Aug. 11, 2015; dated Nov. 3, 2015; 7 pages.

(Continued)

*Primary Examiner* — Greg Binda
(74) *Attorney, Agent, or Firm* — Cantor Colburn LLP

(57) ABSTRACT

A damping mechanism configured for use with a coupling of a power transmission assembly is provided including a cylindrical body having a first end and a second opposite end. The first end is configured for attachment to a first component of a power transmission assembly. A groove is formed in an exterior surface of the cylindrical body adjacent the second end. A cylindrical ring generally complementary to the groove is positioned partially within the groove such that a void exists between an inner surface of the cylindrical ring and the cylindrical body within the groove. A viscous material is arranged within the void such that non-concentric movement of the cylindrical ring relative to the cylindrical body causes displacement of the viscous material.

13 Claims, 3 Drawing Sheets

(51) Int. Cl.
  *B64C 27/82* (2006.01)
  *F16D 1/02* (2006.01)
  *F16D 3/12* (2006.01)
(52) U.S. Cl.
  CPC ............ *F16D 3/12* (2013.01); *F16F 2222/12* (2013.01); *F16F 2234/02* (2013.01); *Y10T 403/257* (2015.01); *Y10T 403/259* (2015.01)
(58) Field of Classification Search
  CPC ..... B64C 27/82; B64C 27/06; Y10T 403/257; Y10T 403/259
  USPC ............... 464/79, 99; 244/60; 188/268, 306; 403/38, 39
  See application file for complete search history.

(56) References Cited

U.S. PATENT DOCUMENTS

| | | | |
|---|---|---|---|
| 3,522,962 A * | 8/1970 | Poker, Jr. | F16C 11/045 403/39 |
| 4,384,858 A | 5/1983 | Kronert et al. | |
| 4,387,909 A * | 6/1983 | Takavarasha | B60G 15/062 |
| 5,116,201 A | 5/1992 | Frademburgh et al. | |
| 5,400,878 A | 3/1995 | D'Anna et al. | |
| 5,755,622 A * | 5/1998 | Kanki | F16D 3/14 464/99 |
| 6,394,387 B1 | 5/2002 | Mitrovic | |
| 6,938,888 B2 | 9/2005 | Levallard et al. | |
| 7,476,050 B2 * | 1/2009 | Ditzler | E02F 9/006 403/39 |

OTHER PUBLICATIONS

Written Opinion of the International Searching Authority for Interntional Appln. No. PCT/US2015/044671; Interntional Filing Date: Aug. 11, 2015; dated Nov. 3, 2015; 4 pages.

* cited by examiner

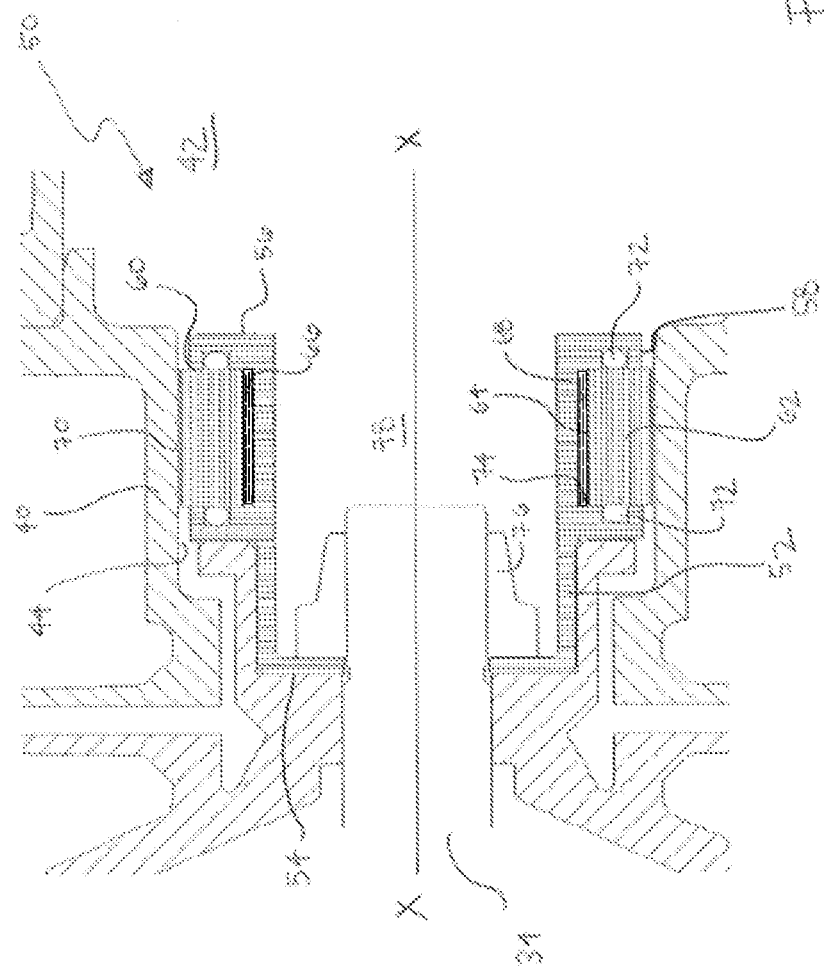

VISCOUS DAMPER

CROSS REFERENCE TO RELATED APPLICATIONS

This application is a National Stage application of PCT/US2015/044671, filed Aug. 11, 2015, which claims the benefit of U.S. Provisional Application No. 62/036,674, filed Aug. 13, 2014, both of which are incorporated by reference in their entirety herein.

BACKGROUND OF THE INVENTION

Exemplary embodiments of the invention relate generally to power transmission assemblies, and more particularly, to an arrangement for coupling two co-axial shaft members of a power transmission assembly.

Gas turbine engines, especially small turbine engines, are often used to provide mechanical energy through a transmission or gearbox, such as in a rotary wing aircraft for example. The shaft of such an engine is designed to rotate at a high rate of revolutions per minute. In order to couple the engine shaft to a shaft of the gearbox or transmission, a coupling may be added to allow minor angular and/or axial deviation between shafts. During operation, forces such as hoop stress generated by the high centrifugal force act upon the coupling. This stress is a potential cause of damage to the coupling, or less efficient transfer of the rotational forces.

BRIEF DESCRIPTION OF THE INVENTION

According to one embodiment of the invention, a damping mechanism configured for use with a coupling of a power transmission assembly is provided including a cylindrical body having a first end and a second opposite end. A groove is formed in an exterior surface of the cylindrical body adjacent the second end. A cylindrical ring generally complementary to the groove is positioned partially within the groove such that a void exists between an inner surface of the cylindrical ring and the cylindrical body within the groove. A viscous material is arranged within the void. Non-concentric movement of the cylindrical ring relative to the cylindrical body causes displacement of the viscous material.

In addition to one or more of the features described above, or as an alternative, in further embodiments the cylindrical ring is configured to form a slip fit arrangement with an adjacent surface of the coupling.

In addition to one or more of the features described above, or as an alternative, in further embodiments the cylindrical body includes a first portion adjacent the first end and a second portion adjacent a second end. The first portion has a first thickness and the second portion has a second thickness, different from the first thickness.

In addition to one or more of the features described above, or as an alternative, in further embodiments the second thickness is greater than the first thickness.

In addition to one or more of the features described above, or as an alternative, in further embodiments the first end of the cylindrical body is configured to couple to the coupling and to a first shaft of the power transmission assembly.

In addition to one or more of the features described above, or as an alternative, in further embodiments at least one seal is arranged partially within the groove adjacent the cylindrical ring. The seal is configured to limit movement of the viscous material from the void.

In addition to one or more of the features described above, or as an alternative, in further embodiments the cylindrical ring is movable within the groove.

According to another embodiment of the invention, a power transmission assembly is provided including a first shaft, a second shaft, and a coupling configured to transmit rotation between the first shaft and the second shaft. The coupling has a generally hollow central portion. A damping mechanism is arranged within the hollow central portion of the coupling and includes a cylindrical body having a first end and a second opposite end. A groove is formed in an exterior surface of the cylindrical body adjacent the second end. A cylindrical ring generally complementary to the groove is positioned partially within the groove such that a void exists between an inner surface of the cylindrical ring and the cylindrical body within the groove. A viscous material is arranged within the void. Non-concentric movement of the cylindrical ring relative to the cylindrical body causes displacement of the viscous material.

In addition to one or more of the features described above, or as an alternative, in further embodiments the cylindrical ring is configured to form a slip fit arrangement with an adjacent surface of the coupling.

In addition to one or more of the features described above, or as an alternative, in further embodiments the first shaft and the second shaft are arranged coaxially.

In addition to one or more of the features described above, or as an alternative, in further embodiments the coupling is arranged generally concentrically about an axis of rotation of the first shaft and the second shaft.

In addition to one or more of the features described above, or as an alternative, in further embodiments displacement of the viscous material within the void is configured to dampen misalignment of the first shaft and the second shaft.

In addition to one or more of the features described above, or as an alternative, in further embodiments the first end of the cylindrical body is configured to couple to the first shaft.

In addition to one or more of the features described above, or as an alternative, in further embodiments the power transmission assembly is arranged within a rotary wing aircraft.

In addition to one or more of the features described above, or as an alternative, in further embodiments the first shaft is a transmission shaft of a rotor system and the second shaft is an engine shaft.

In addition to one or more of the features described above, or as an alternative, in further embodiments at least one seal is arranged partially within the groove adjacent the cylindrical ring. The seal is configured to limit movement of the viscous material from the void.

Technical effects include a coupling configured to dampen misalignment of coaxial rotating shafts.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is a detailed cross-sectional view of a power transmission assembly including a coupling according to an embodiment of the invention.

The detailed description explains embodiments of the invention, together with advantages and features, by way of example with reference to the drawings.

DETAILED DESCRIPTION OF THE INVENTION

Figure 1:
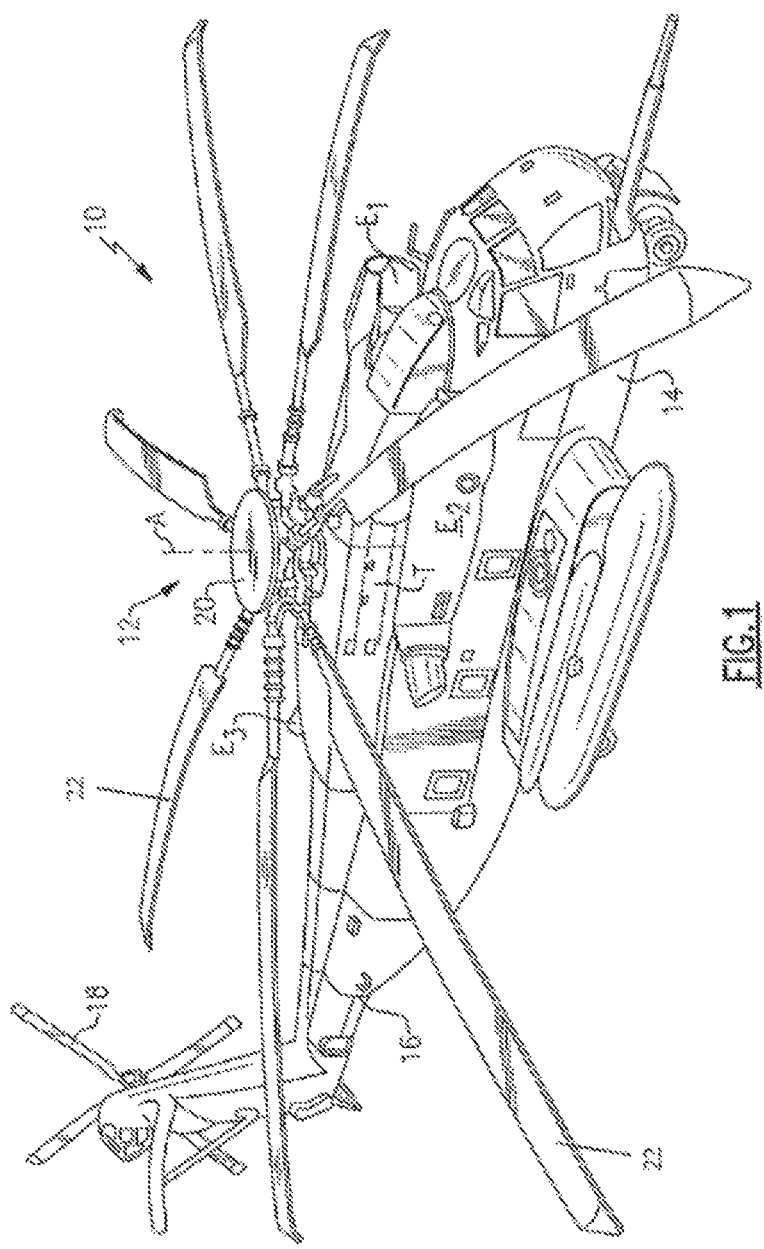
FIG. 1 is a perspective view of an example of a rotary wing aircraft.

FIG. 1 schematically illustrates a rotary wing aircraft 10 having a main rotor assembly 12. The aircraft 10 includes an airframe 14 having an extending tail 16 which mounts a tail rotor system 18, such as an anti-torque system, a translational thrust system, a pusher propeller a rotor propulsion system, and the like. The main rotor assembly 12 includes a plurality of rotor blade assemblies 22 mounted to a rotor hub 20. The main rotor assembly 12 is driven about an axis of rotation A through a main gearbox (illustrated schematically at T) by one or more engines E. Although a particular helicopter configuration is illustrated and described in the disclosed embodiment, other configurations and/or machines, such as high speed compound rotary wing aircrafts with supplemental translational thrust systems, dual contra-rotating, coaxial rotor system aircrafts, tilt-rotors and tilt-wing aircrafts, and fixed wing aircrafts, will also benefit from embodiments of the invention.

Figure 2:
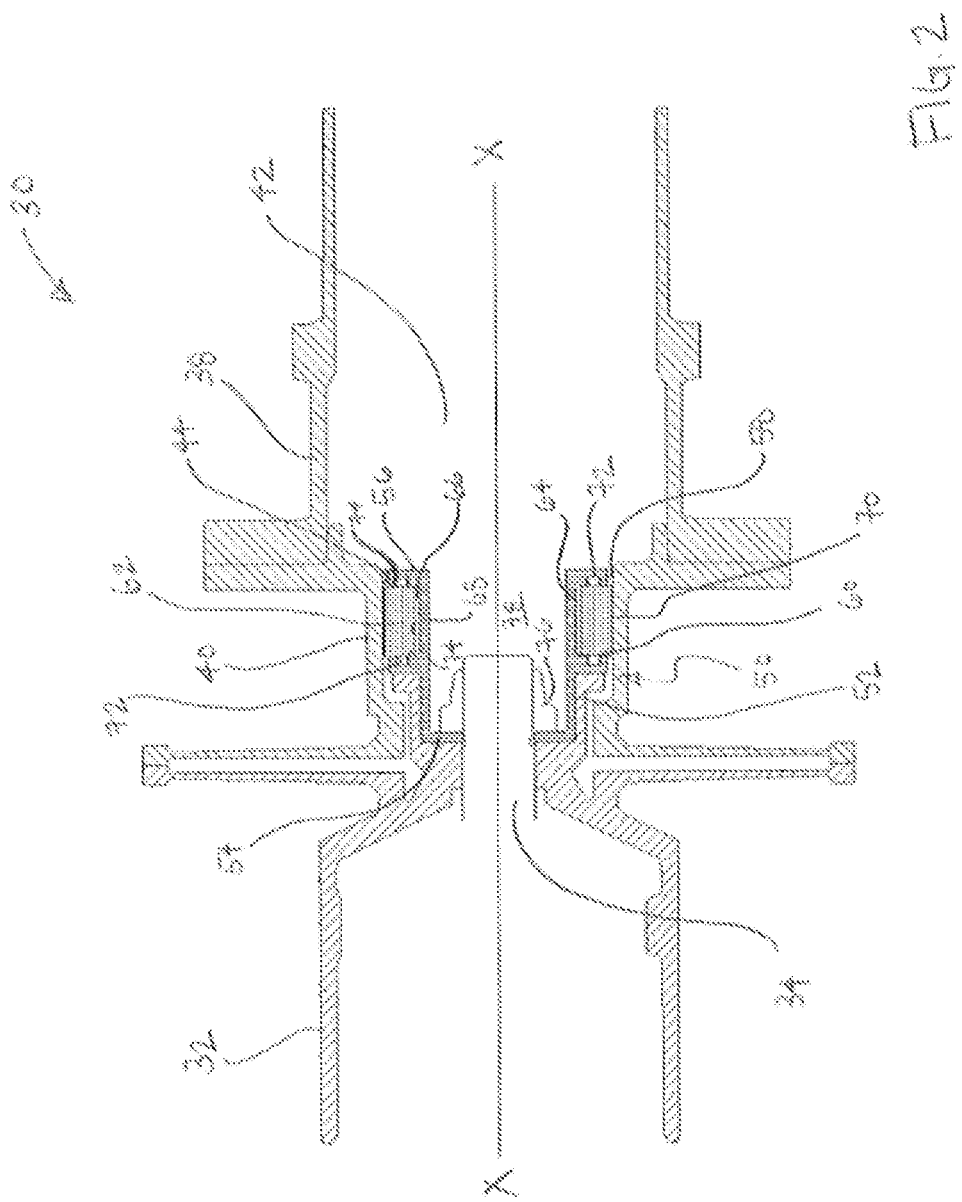
FIG. 2 is an cross-sectional view of a power transmission assembly including a coupling according to an embodiment of the invention.

Referring now to FIGS. 2 and 3, a power transmission assembly 30, such as used in a rotary wing aircraft 10 for example, is illustrated. The power transmission assembly 30 includes a first shaft 32, such as a transmission shaft connected to a main rotor system 12 of a rotary wing aircraft 10 for example, and a second shaft 36, such as an engine output shaft of a gas turbine engine E for example. Although the power transmission assembly 30 is described with respect to a rotary wing aircraft 10, other power transmission assemblies having two shafts coaxially coupled are within the scope of the invention. In the illustrated, non-limiting embodiment, the first shaft 32 and the second shaft 36 have a substantially identical diameter. However, configurations where the first shaft 32 and the second shaft 36 have different size diameters, such as configurations where the first shaft 32 has a diameter larger than the second shaft 36 and also configurations where the first shaft 32 has a diameter smaller than the second shaft 36 are within the scope of the invention.

A coupling 40 flexibly couples a first end 34 of the first shaft 32 and the second shaft 36, respectively, such that the first and second shaft 32, 36 are arranged coaxially and are configured to rotate about a shared axis of rotation X. In the illustrated, non-limiting embodiment, the coupling 40 connects to at least one of the first shaft 32 and the second shaft 36 with at least one fasteners 42; however, other connecting mechanisms can be used to connect the coupling 40 to the shafts 32, 36 and are within the scope of the invention. The coupling 40 may include a pair of connected diaphragms 46 that extend radially outward from a central portion 44 thereof. If the first and second shaft 32, 36 become axially misaligned, the diaphragms 46 are configured to bend or flex to accommodate the slightly offset or angular orientation.

Arranged within the hollow, central portion 44 of the coupling 40, between the first and second shafts 32, 36, is a damping mechanism 50 arranged generally concentrically with the axis of rotation X of the shafts 32, 36. The damping mechanism has a generally hollow cylindrical body 52 made of a metal material including, but not limited to steel, titanium, or aluminum for example. The body 52 has a non-uniform thickness, such that the portion of the body 52 adjacent a first end 54 has a first thickness, and the portion of the body 52 adjacent a second, opposite end 56 has a second thickness. In one embodiment, shown in the FIGS., the second thickness is substantially greater than the first thickness.

A groove 60 formed in the exterior surface 58 of the body 52 near the second end 56 extends about the circumference thereof. Partially arranged within the groove 60 is a cylindrical ring 62 which extends around the axis of rotation X and remains in the groove 60. The cylindrical ring 62 is formed from a wear-resistant material, such as steel, titanium, aluminum, plastic, or composite for example. The width and thickness of the cylindrical ring 62 are generally complementary to the groove 60. However, the inner diameter of the ring 62 is slightly larger than the diameter of the body 52 within the groove 60 such that a space or void 66 generally exists between the inner surface 64 of the cylindrical ring 62 and the adjacent surface 68 of the body 52. The void 66 is filled with a viscous material, such as a fluid or paste for example. As a result, an outer surface 70 of the cylindrical ring 62 extends beyond the exterior surface 58 of the body 52 adjacent the groove 60. In the illustrated, non-limiting embodiment, a seal 72, for example an O-ring, is arranged within an opening (not shown) formed in each of the sidewalls 74 that define the groove 60. Each seal 72 is configured to block the flow of the viscous material around the cylindrical ring 62 such that the viscous material remains within the void 66 between the body 52 and the cylindrical ring 62.

The first end 34 of the first shaft 32 is configured to couple to the damping mechanism 50 adjacent the first end 54. In the illustrated, non-limiting embodiment, the first end 34 extends through the central portion 44 of the coupling 40 and the first end 54 of the damping mechanism 50 into the hollow interior 78 of the body 52. A shaft nut 76 may be arranged within the hollow interior 78 of the body 52 to couple the first shaft to the coupling 40 and the damping mechanism 50. Alternatively, a fastener (not shown) may extend through the opening (not shown) in the first end 54 and attach directly to the first shaft 34, or the first end 34 of the shaft 32 may be configured to threadably couple directly to one or both of the coupling 40 and the damping mechanism 50.

The second end 56 of the body 52 of the damping mechanism 50 is positioned near a surface of the portion of the coupling 40 connected to the second shaft 36. The outer surface 70 of the cylindrical ring 62 is configured to contact the adjacent surface 48 of the coupling 40 in a slip fit configuration.

The damping mechanism 50 is configured to minimize the misalignment of the first and second shaft 32, 36 by providing resistance to the flexure of the diaphragms 46 of the coupling 40. If during operation, the first and second shafts 32, 36 remain axially concentric, the void 66 filled with viscous material remains generally constant. However, if the shafts 32, 36 become axially misaligned (non-concentric) and the diaphragms 46 of the coupling 40 start to flex, the surface 48 of the coupling 40 contacts the cylindrical ring 62. This force causes the cylindrical ring 62 to move within the groove 60, thereby displacing the viscous material within the void 66. The displacement of the viscous material provides a dampened resistance to the misalignment of the non-axial shafts 32, 36. The damping resistance provided by the damping mechanism 50 is determined by the viscosity of the viscous material. For example, a viscous material having a higher viscosity will provide greater damping resistance to non-axial rotation than a lower viscosity material. The viscous material within the void 66 is also configured to act as a vibration damper which may alter the frequency harmonics of the shafts 32, 36 and the coupling 40.

The damping mechanism 50 described herein when used in conjunction with a coupling 40 arranged between generally coaxial shafts 32, 36, is configured to minimize the effects of any misalignment of the shafts 32, 36. By allowing the cylindrical ring 62 to move or float within the groove 60, the displaceable viscous material prevents vibration from being transmitted between the shafts 32, 36.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. By way of example. While shown in the context of shafts within an aircraft, it is understood that aspects can be used to connect other concentric shafts in non-aircraft applications, such as for maritime engines, industrial machinery, automotive transmission, and other like applications. Accordingly, the invention is not to be seen as limited by the foregoing description, but is only limited by the scope of the appended claims.

What is claimed is:

1. A damping mechanism configured for use with a coupling of a power transmission assembly comprising:
   a cylindrical body having a first end, and a second, opposite end, a groove being formed in a first surface of the cylindrical body adjacent the second end, wherein a thickness of the cylindrical body adjacent the second end is greater than a thickness of the cylindrical body adjacent the first end;
   a cylindrical ring generally complementary to the groove being partially positioned within the groove such that a void exists between the cylindrical ring and a surface of the cylindrical body within the groove; and
   a viscous material arranged within the void wherein non-concentric movement of the cylindrical ring relative to the cylindrical body causes displacement of the viscous material.

2. The damping mechanism according to claim 1, wherein the cylindrical ring forms a slip fit arrangement with an adjacent surface of the coupling.

3. The damping mechanism according to claim 1, wherein the first end of the cylindrical body is configured to couple to the coupling and to a first shaft of the power transmission assembly.

4. The damping mechanism according to claim 1, further comprising at least one seal arranged partially within the groove adjacent the cylindrical ring, the seal being configured to limit movement of the viscous material from the void.

5. The damping mechanism according to claim 1, wherein the cylindrical ring is movable within the groove.

6. A power transmission assembly comprising:
   a first shaft;
   a second shaft; and
   a coupling configured to transmit rotation of the second shaft to the first shaft, the coupling having a generally hollow central portion;
   a damping mechanism arranged within the hollow central portion of the coupling, the damping mechanism including:
   a cylindrical body having a first end, and a second, opposite end, a groove being formed in an exterior surface of the cylindrical body adjacent the second end, wherein a thickness of the cylindrical body adjacent the second end is greater than a thickness of the cylindrical body adjacent the first end;
   a cylindrical ring generally complementary to the groove being partially positioned within the groove such that a void exists between an inner surface of the cylindrical ring and a surface of the cylindrical body within the groove; and
   a viscous material arranged within the void wherein non-concentric movement of the cylindrical ring relative to the cylindrical body causes displacement of the viscous material.

7. The power transmission assembly according to claim 6, wherein the cylindrical ring forms a slip fit arrangement with the second shaft.

8. The power transmission assembly according to claim 6, wherein the first shaft and the second shaft are arranged coaxially.

9. The power transmission assembly according to claim 6, wherein the damping mechanism is arranged generally concentrically about an axis of rotation of the first shaft and the second shaft.

10. The power transmission assembly according to claim 6, wherein displacement of the viscous material within the void is configured to dampen misalignment of the first shaft and the second shaft.

11. The power transmission assembly according to claim 10, wherein the first shaft is a transmission shaft of a rotor system and the second shaft is an engine shaft.

12. The power transmission assembly according to claim 6, wherein the first end of the cylindrical body is configured to couple to the first shaft.

13. The power transmission assembly according to claim 6, where the power transmission assembly is arranged within a rotary wing aircraft.

\* \* \* \* \*